(12) United States Patent
Bodard et al.

(10) Patent No.: US 10,995,702 B2
(45) Date of Patent: May 4, 2021

(54) HEATING SYSTEM FOR CONVERGENT-DIVERGENT SECONDARY NOZZLE

(71) Applicant: SAFRAN AIRCRAFT ENGINES, Paris (FR)

(72) Inventors: Guillaume Bodard, Moissy-Cramayel (FR); Jeremy Paul Francisco Gonzalez, Moissy-Cramayel (FR); Norman Bruno Andre Jodet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 122 days.

(21) Appl. No.: 16/105,159

(22) Filed: Aug. 20, 2018

(65) Prior Publication Data

US 2019/0078534 A1 Mar. 14, 2019
US 2020/0378339 A9 Dec. 3, 2020

(30) Foreign Application Priority Data

Aug. 21, 2017 (FR) ........................................ 1757775
Aug. 21, 2017 (FR) ........................................ 1757777

(51) Int. Cl.
*F02K 3/115* (2006.01)
*F02K 3/08* (2006.01)
(Continued)

(52) U.S. Cl.
CPC .............. *F02K 3/115* (2013.01); *F02K 3/08* (2013.01); *F02K 1/34* (2013.01); *F02K 1/386* (2013.01);
(Continued)

(58) Field of Classification Search
CPC ........ F02C 7/24; F02C 7/045; F02D 2260/96; F02D 2260/964; F02K 1/827; F02K 1/44;
(Continued)

(56) References Cited

U.S. PATENT DOCUMENTS

| 7,770,381 B2 * | 8/2010 | Johnson | .................... F02K 1/82 |
| | | | 60/226.1 |
| 8,631,655 B2 * | 1/2014 | Dooley | .................. F01D 15/10 |
| | | | 60/266 |

(Continued)

FOREIGN PATENT DOCUMENTS

| EP | 1344928 A2 | 9/2003 |
| FR | 2986832 A1 | 8/2013 |

(Continued)

OTHER PUBLICATIONS

Communication dated May 11, 2018, from National Institute of Industrial Property in counterpart application No. 1757777.

*Primary Examiner* — Andrew H Nguyen
*Assistant Examiner* — Stephanie Sebasco Cheng
(74) *Attorney, Agent, or Firm* — Sughrue Mion, PLLC

(57) ABSTRACT

An assembly for a rear of a dual-flow turbomachine having a longitudinal axis includes a secondary nozzle and a heating system. The secondary nozzle is defined about the longitudinal axis and ejects a mixture of the flows coming from a secondary vein and a primary vein of the turbomachine. The secondary nozzle is of a convergent-divergent form with a neck corresponding to a minimal cross-cross-section of the secondary nozzle. The heating system is located on a portion of the internal circumference of the secondary nozzle longitudinally in the region of the neck or upstream from the neck.

8 Claims, 9 Drawing Sheets

Figure 1:
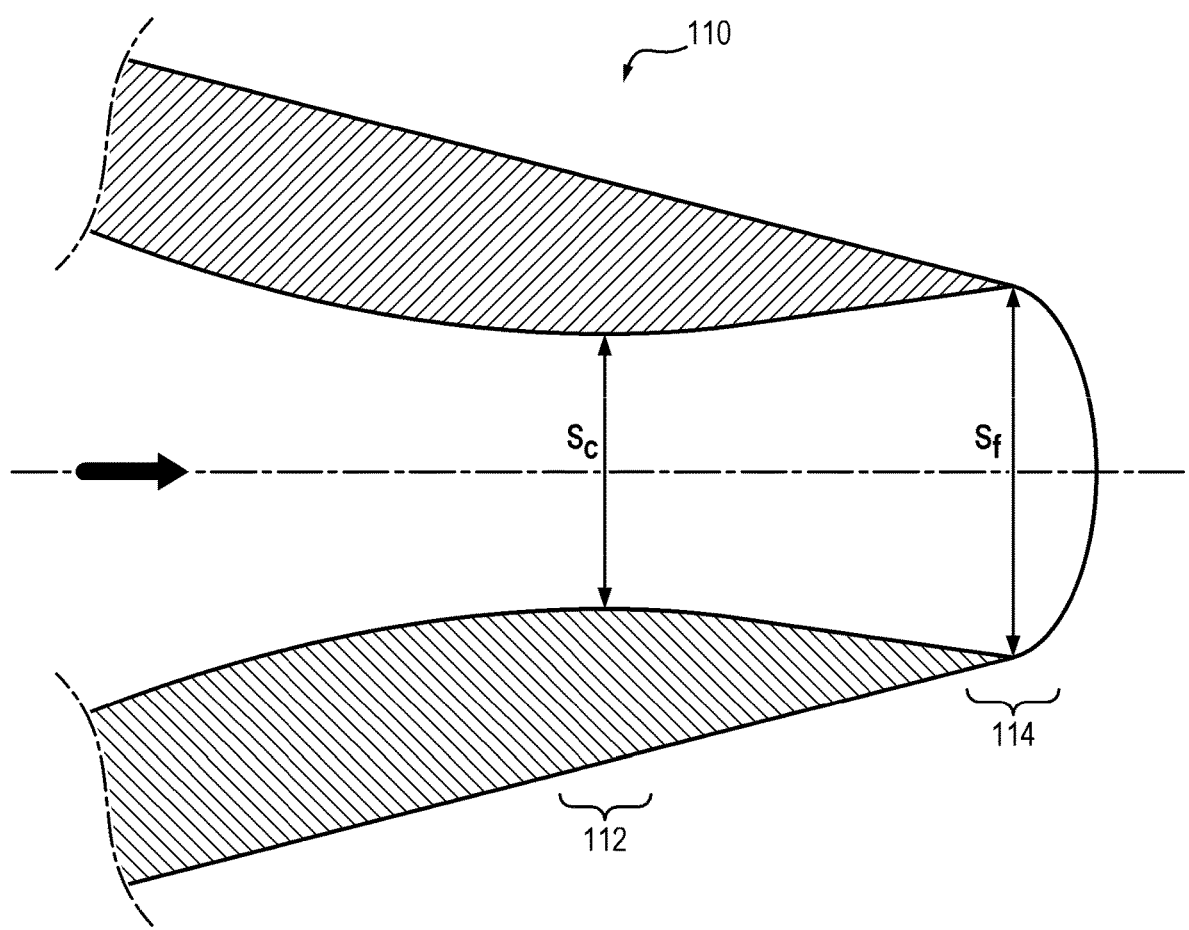

(51) Int. Cl.
*F02K 1/38* (2006.01)
*F02K 1/46* (2006.01)
*F02K 1/48* (2006.01)
*F02K 1/34* (2006.01)

(52) U.S. Cl.
CPC .................................... *F02K 1/46* (2013.01); *F02K 1/48* (2013.01); *F05D 2240/128* (2013.01); *F05D 2260/96* (2013.01)

(58) Field of Classification Search
CPC ... F02K 1/46; F02K 1/386; F02K 1/48; F02K 3/115; F02K 3/11; F02K 3/105
See application file for complete search history.

(56) References Cited

U.S. PATENT DOCUMENTS

| | | | |
|---|---|---|---|
| 10,590,849 B2* | 3/2020 | Kenyon | F02K 7/14 |
| 10,724,438 B2* | 7/2020 | Macchia | F02C 7/10 |
| 2010/0154423 A1* | 6/2010 | Olausson | F02K 1/48 |
| | | | 60/725 |
| 2019/0174580 A1* | 6/2019 | Gaab | H05B 3/12 |

FOREIGN PATENT DOCUMENTS

| | | |
|---|---|---|
| FR | 3009027 A1 | 1/2015 |
| WO | 2016151267 A1 | 9/2016 |

* cited by examiner

HEATING SYSTEM FOR CONVERGENT-DIVERGENT SECONDARY NOZZLE

The present invention relates to the field of noise reduction for mixed-flow turbomachines. It relates more particularly to the rear body of a mixer turbojet, where the primary flow exits from the engine and the secondary flow mixes inside a secondary nozzle to form a jet propelled in the external air.

The field of relevant turbomachines relates to LDMF ("long duct mixed-flow") nozzles, that is, a secondary nozzle extending beyond the flow mixture.

The invention relates in particular to solutions made to the problems of acoustics in terms of secondary nozzle known as convergent-divergent.

PRIOR ART

In terms of nozzles known as convergent-divergent, a source of noise occurs because a Mach pocket is present in the region of the neck of the nozzle.

In fact, the interaction between turbulence coming from the mixture of the two flows and the supersonic flow zones in the nozzle is a source of high-frequency noise. This phenomenon can appear especially when the nozzle starts to prime.

This phenomenon is observed more clearly when a lobe mixer is installed at the confluence of the primary and secondary flows.

Reference is made to applications FR2902469 or EP1870588 for the mixers, and to document WO2015/036684 which proposes a solution by means of chevrons located on the trailing edge of the nozzle.

However, the present invention relates to nozzles known as convergent-divergent. The latter improve the performances of the mixed-flow nozzles, especially by increasing the size of the convergent-divergent (ratio called "CVDC" and referenced conventionally A9/A8—see FIG. 1, which illustrate a nozzle 110, a trailing edge 114 and a neck 112 and the respective cross-sections $S_f/S_c$). A convergent-divergent nozzle, by definition, has a minimal cross-section whereof the axial positioning does not coincide with one of the ends of the conduit. The use of a secondary convergent-divergent nozzle has two advantages: it substantially modifies the flow coefficient with low expansion ratio and improves the performance of the nozzle. This increase is beneficial for the performance of the engine but it is acoustically disadvantageous.

Figure 2:
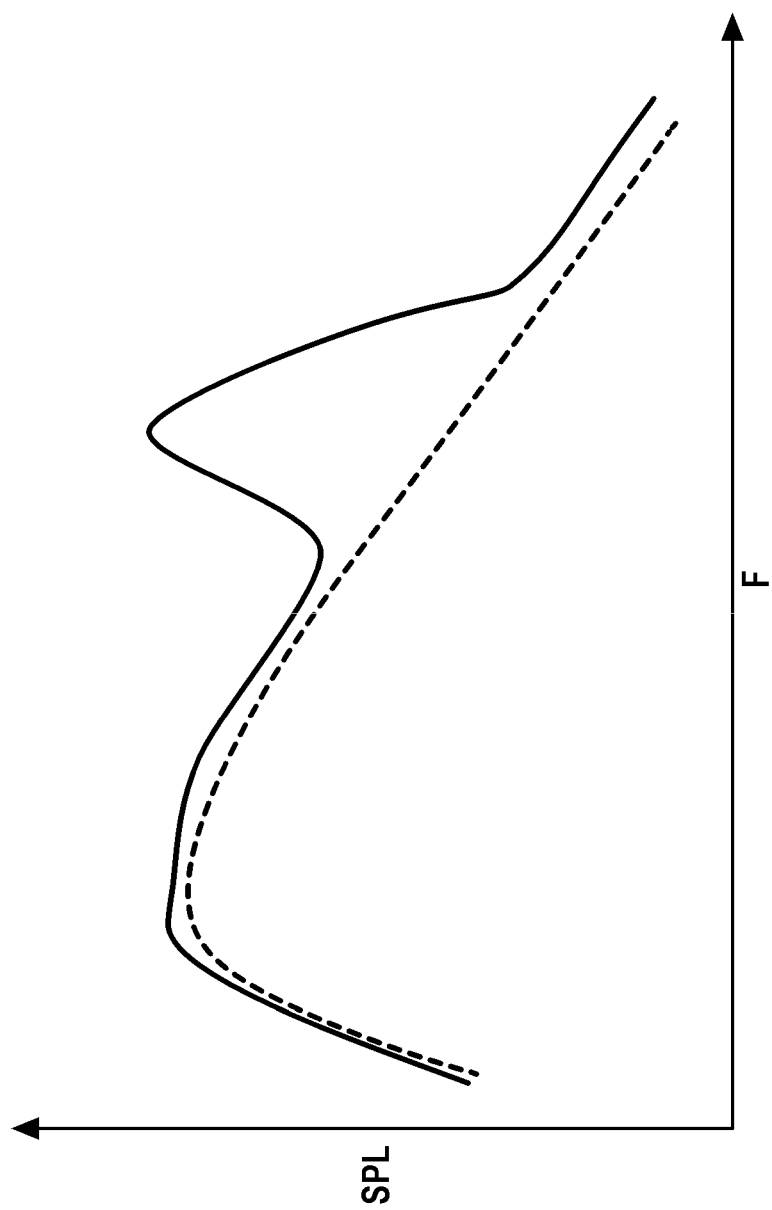

As indicated previously, on observe in the region of the neck the apparition of a Mach pocket (see FIG. 2, where the two curves represent the noise with mixer in solid lines and without mixer in dotted lines—in abscissa the frequency F and in ordinate the level of sound pressure SPL for Sound Pressure Level, in decibel). The turbulences coming from the mixture of the two flows and the Mach pocket cause the occurrence of unwanted noises.

PRESENTATION OF THE INVENTION

The invention aims to reduce the above acoustic consequences, in terms of secondary convergent-divergent nozzle.

For this, the invention proposes an assembly for rear of dual-flow turbomachine having a longitudinal axis, comprising:

a secondary nozzle defined about the longitudinal axis, said secondary nozzle being configured to eject a mixture of the flows coming from a secondary vein and a primary vein of the turbomachine, the secondary nozzle being of convergent-divergent form with a neck corresponding to a minimal cross-cross-section of the secondary nozzle, a heating system with a heating element, the heating element being located on at least one portion of the internal circumference of the secondary nozzle longitudinally in the region of the neck and/or upstream from the neck.

The invention can be broken down into several main embodiments.

In a first embodiment, the heating system comprises a heating radiator system. In this way, the invention relates to an assembly for rear of dual-flow turbomachine having a longitudinal axis, comprising:

a secondary nozzle defined about the longitudinal axis, said secondary nozzle being configured to eject a mixture of the flows coming from a secondary vein and a primary vein of the turbomachine, the secondary nozzle being of convergent-divergent form with a neck corresponding to a minimal cross-cross-section of the secondary nozzle, a heating radiator system, comprising at least one heating plate arranged at least on a portion of the internal circumference of the secondary nozzle longitudinally in the region of the neck and/or upstream from the neck.

The first embodiment can comprise the following characteristics, taken singly or in combination:

the heating plate is an electric radiator, the heating plate extends longitudinally according to a certain distance, the heating radiator system comprises a plurality of heating segments spaced apart from each other along the internal circumference of the nozzle, the assembly comprises also a primary nozzle defining a portion of primary vein, the secondary nozzle defining a portion of secondary vein, and a lobe mixer, at the downstream end of the primary nozzle and having alternating hot lobes extending inside the secondary vein and cold lobes extending inside the primary vein, the assembly comprises the same number of hot lobes as heating segments.

the heating segments are positioned radially facing the hot lobes, near the longitudinal offset, the heating plate extends downstream of the neck over a distance less than or equal to 20% of the diameter of the secondary nozzle at the neck and/or wherein the heating radiator system extends upstream from the neck over a distance less than or equal to twice the diameter of the secondary nozzle at the neck, the heating radiator system has a heating gradient on its surface, the heating radiator system is integrated into the secondary nozzle such that the internal flow surface is continuous so as not to disrupt the flow.

the ratio between the cross-section on the trailing edge of the secondary nozzle and the cross-section at the neck of the secondary nozzle is between 1 and 1.05.

The first embodiment relates to also a turbomachine dual-flow comprising an assembly such as described previously and comprising an electric generator and/or a battery for supplying the heating radiator system.

In a second embodiment, the heating system is a hot-air diffuser system. In this way, the invention relates to an assembly for rear of turbomachine having a longitudinal axis, comprising:
- a primary vein, defined at its downstream end by a primary nozzle,
- a secondary nozzle defining a portion of secondary vein and where the flow coming from the secondary vein and the primary vein can merge, the nozzle being of convergent-divergent form with a neck corresponding to a minimal cross-cross-section of the nozzle,
- a hot-air diffusion system comprising:
    - an air bleed located in an element defining a portion of the primary vein, and configured to draw from the flow circulating in the primary vein,
    - a diffuser positioned on a at least one portion of the internal circumference of the secondary nozzle longitudinally in the region of the neck and/or between the trailing edge of the primary vein and said neck,
    - a pipe, passing through the secondary vein, and connecting the air bleed to the diffuser.

The second embodiment can comprise the following characteristics, taken singly or in combination:
- the diffuser comprises an ejection grille,
- the diffusion system comprises air speed-retarding means arranged between the air bleed and the diffuser,
- the assembly comprises a structural arm passing through the secondary vein inside which the pipe passes,
- the air bleed is located upstream from the structural arm, to follow the natural flow direction,
- the air bleed is positioned in the primary nozzle,
- the primary vein comprises a turbine stage and the air bleed is downstream of the turbine stage,
- air bleed occurs by means of a retractable bailer or else by means of a grille,
- the diffuser extends longitudinally according to a certain distance,
- the diffuser comprises a plurality of diffuser segments spaced apart from each other along the internal circumference of the secondary nozzle,
- the assembly comprises also a lobe mixer having alternating hot lobes extending inside the secondary vein and cold lobes extending inside the primary vein,
- the assembly comprises the same number of hot lobes as segments,
- the diffuser segments are positioned radially facing the hot lobes, near the longitudinal offset.
- the diffuser extends downstream of the neck over a distance less than or equal to 20% of the diameter of the secondary nozzle at the neck and/or wherein the diffuser extends upstream from the neck over a distance less than or equal to one time the diameter of the secondary nozzle at the neck,
- the diffuser is integrated into the secondary nozzle such that the internal flow surface is continuous so as not to disrupt the flow,
- the ratio between the cross-section on the trailing edge of the secondary nozzle and the cross-section at the neck of the secondary nozzle is between 1 and 1.05.

The second embodiment also relates to a dual-flow turbomachine comprising an assembly such as described previously (second embodiment).

PRESENTATION OF FIGURES

Figure 3:
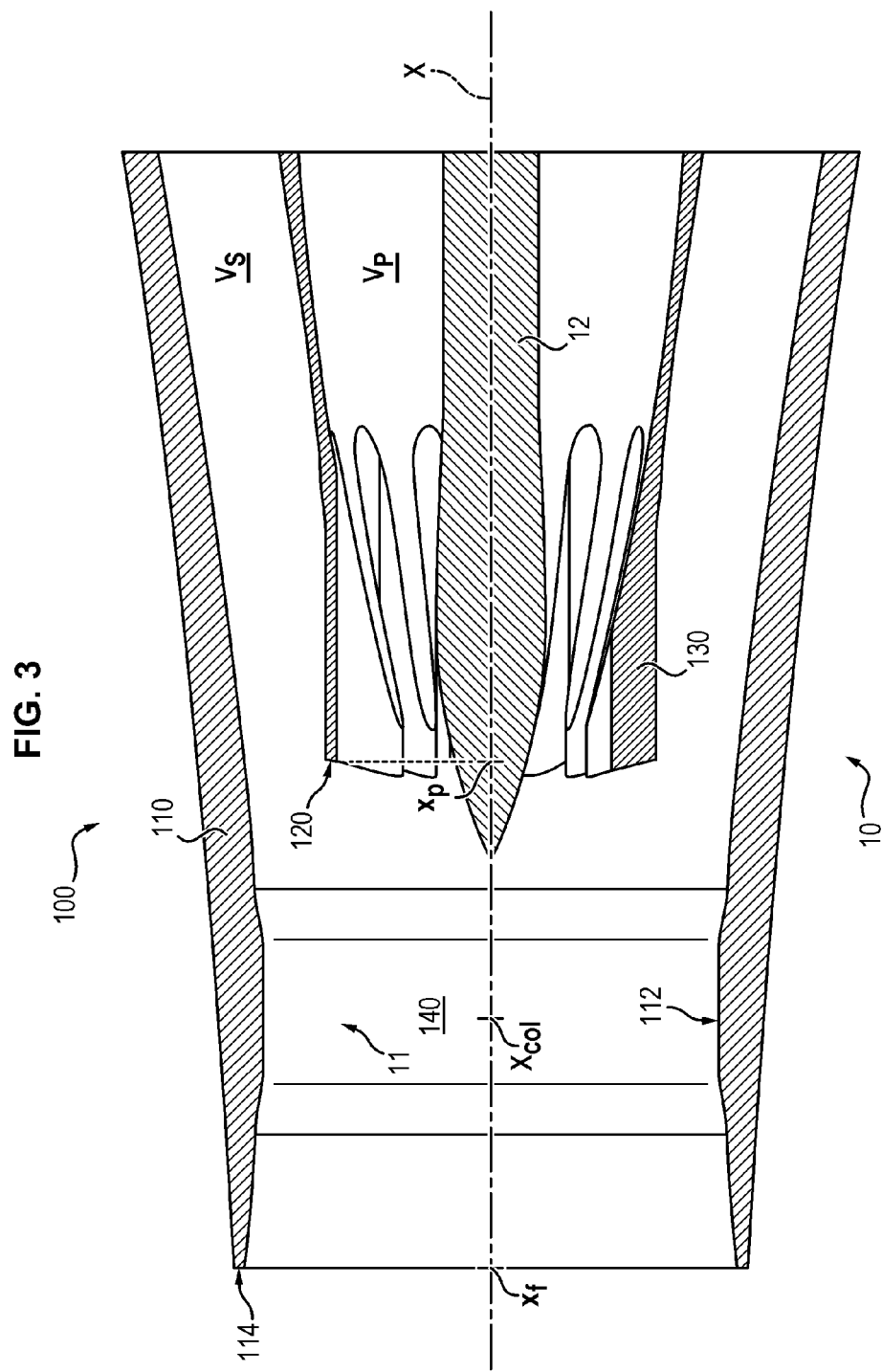
Figure 4:
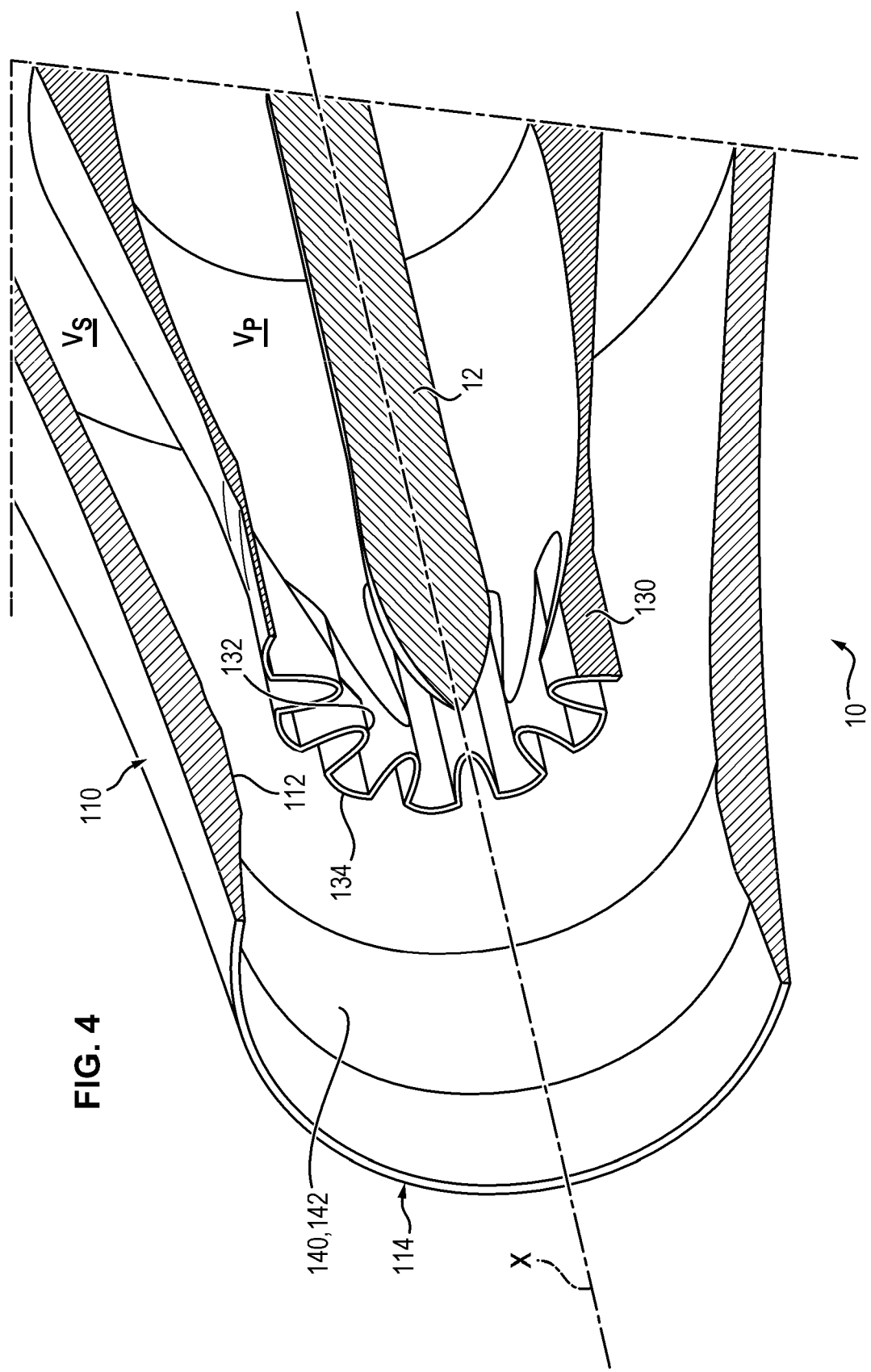
Figure 5:
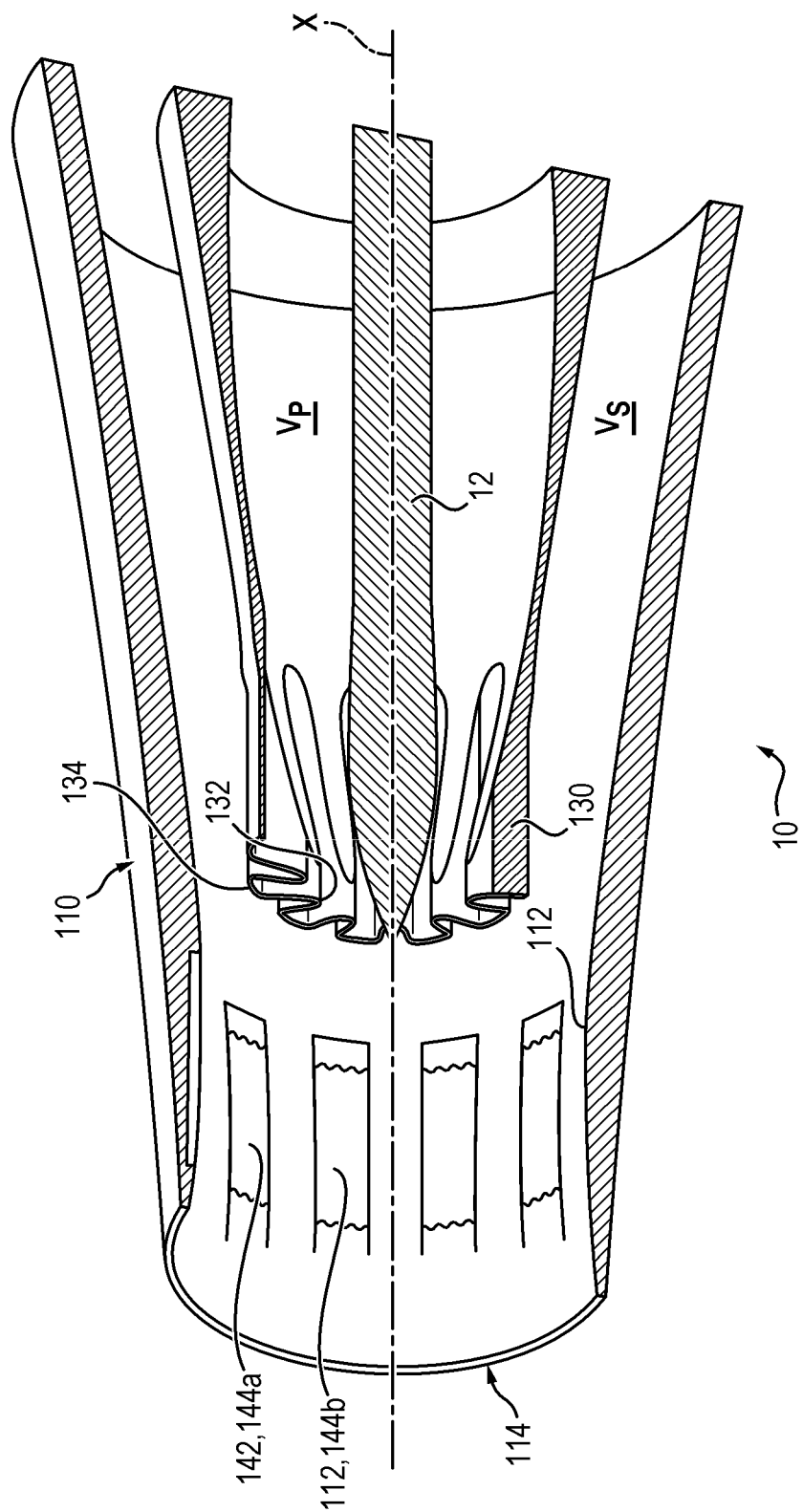
Figure 6:
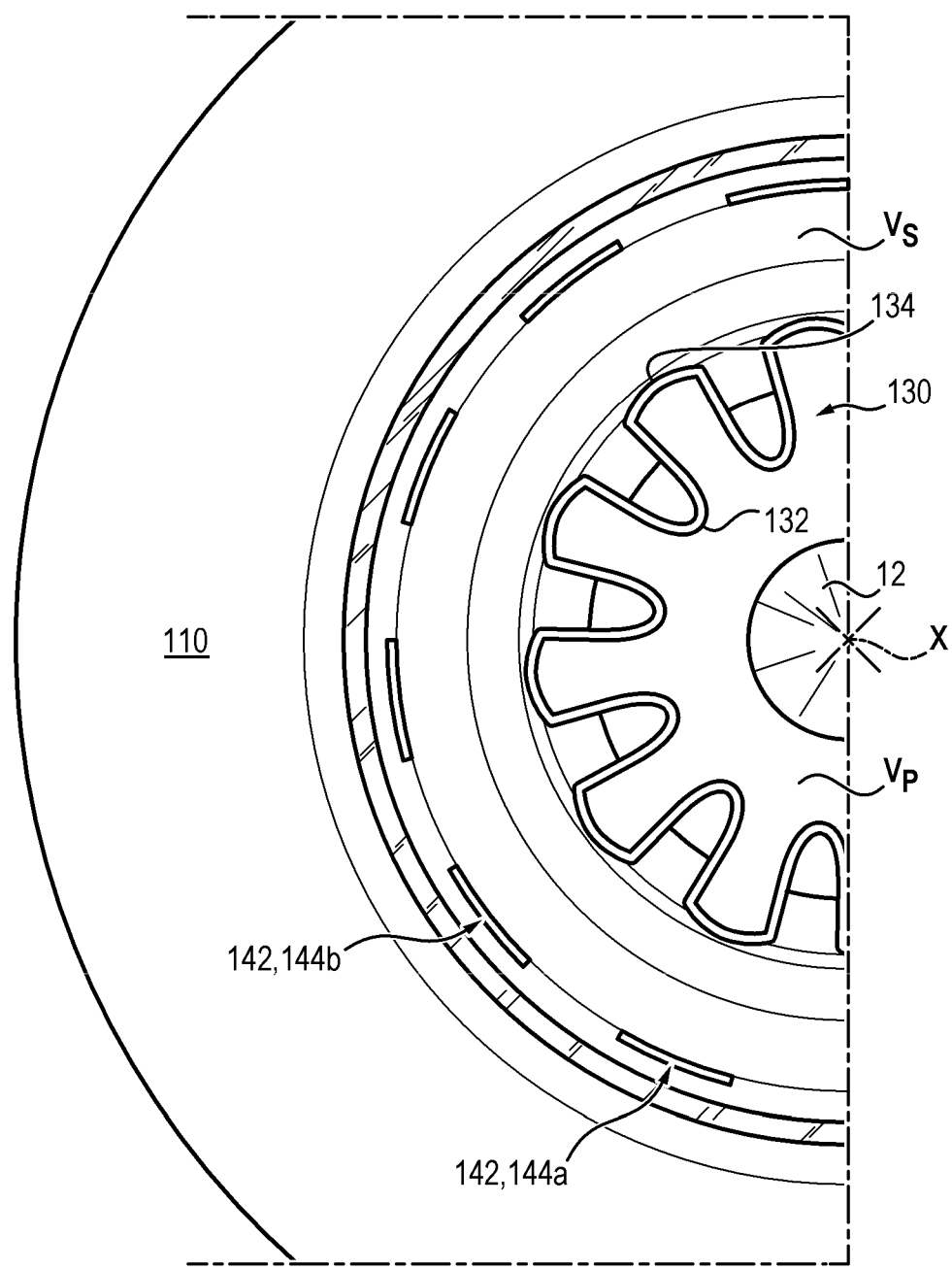
Figure 7:
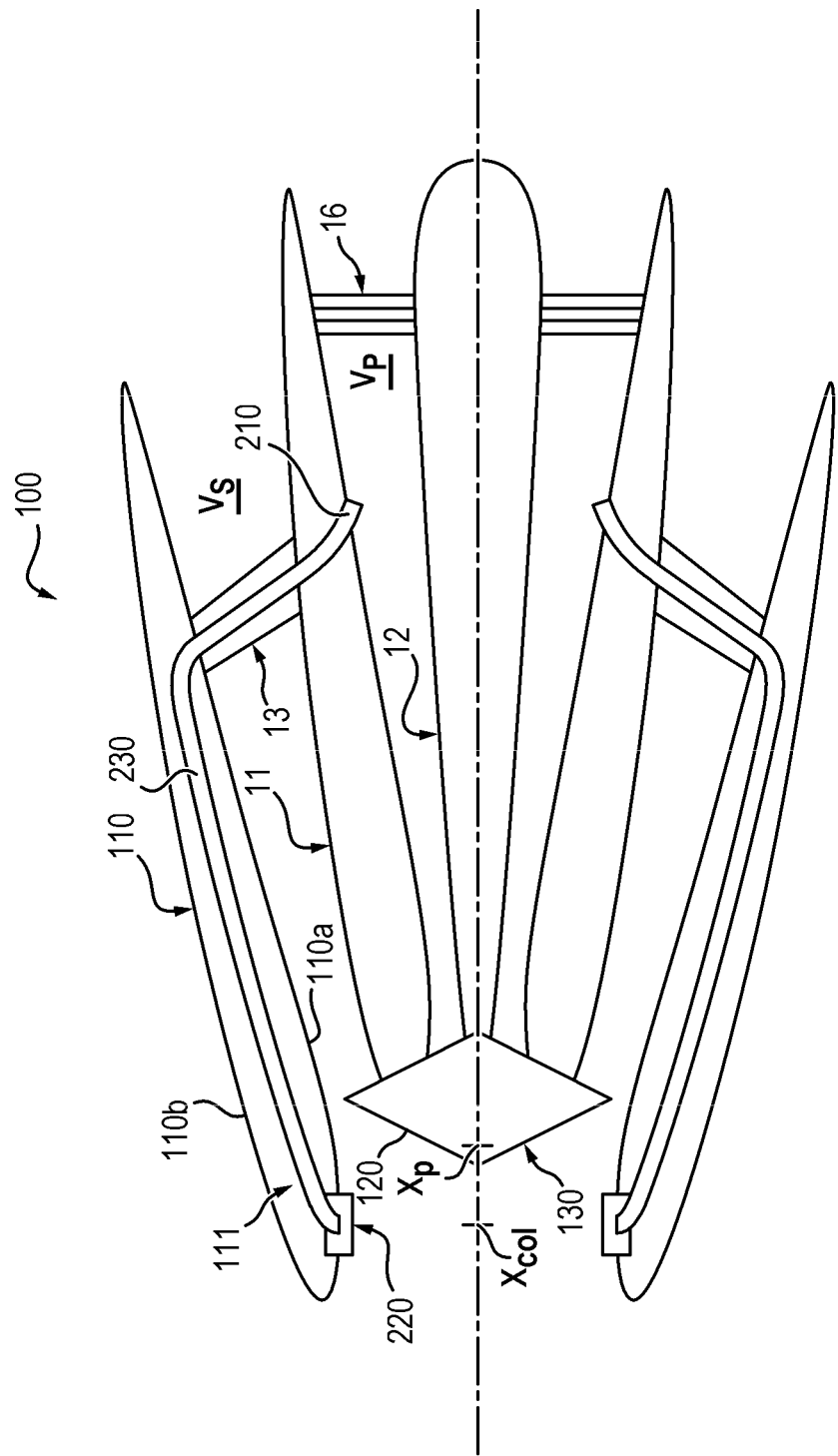
Figure 8:
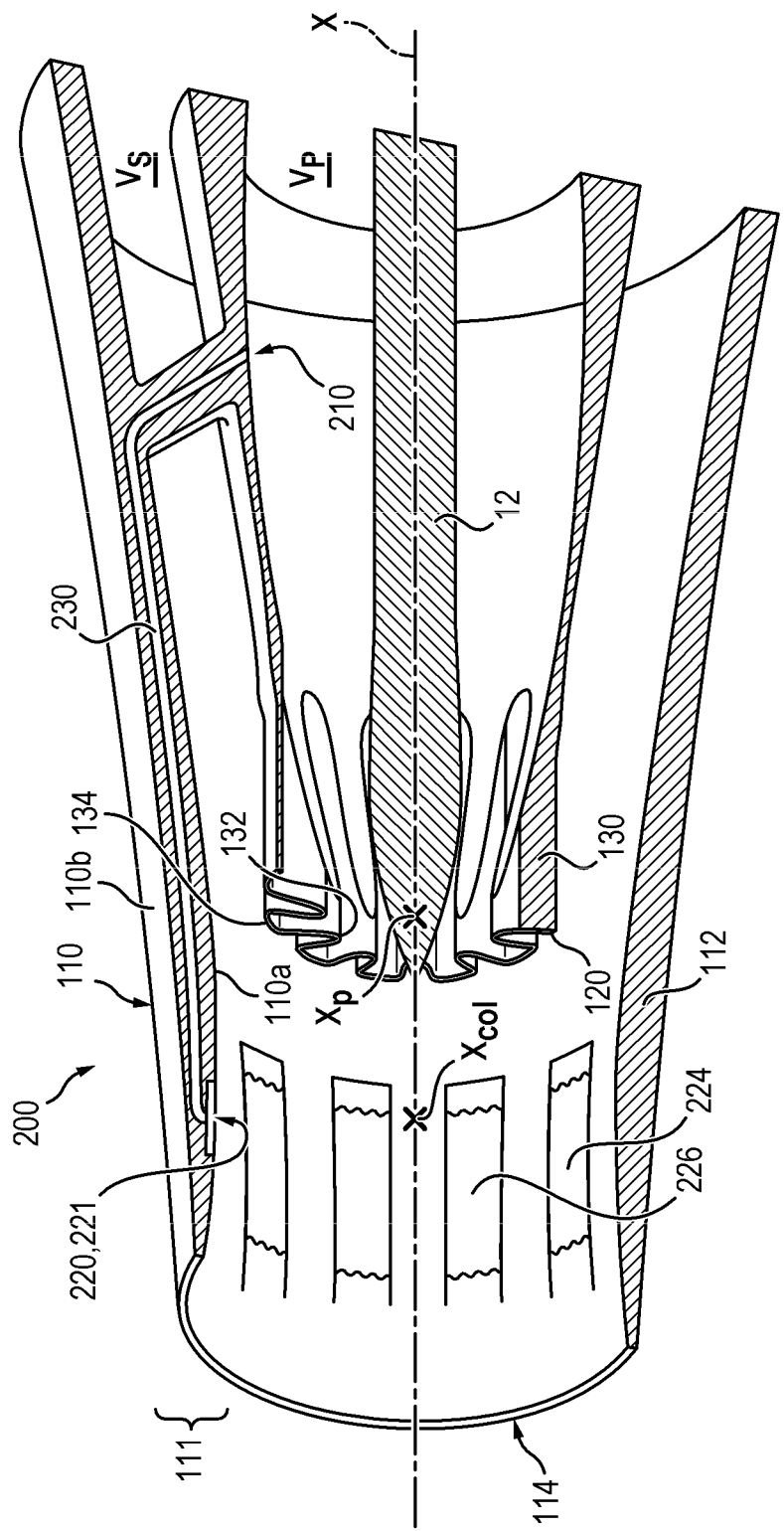
Figure 9:
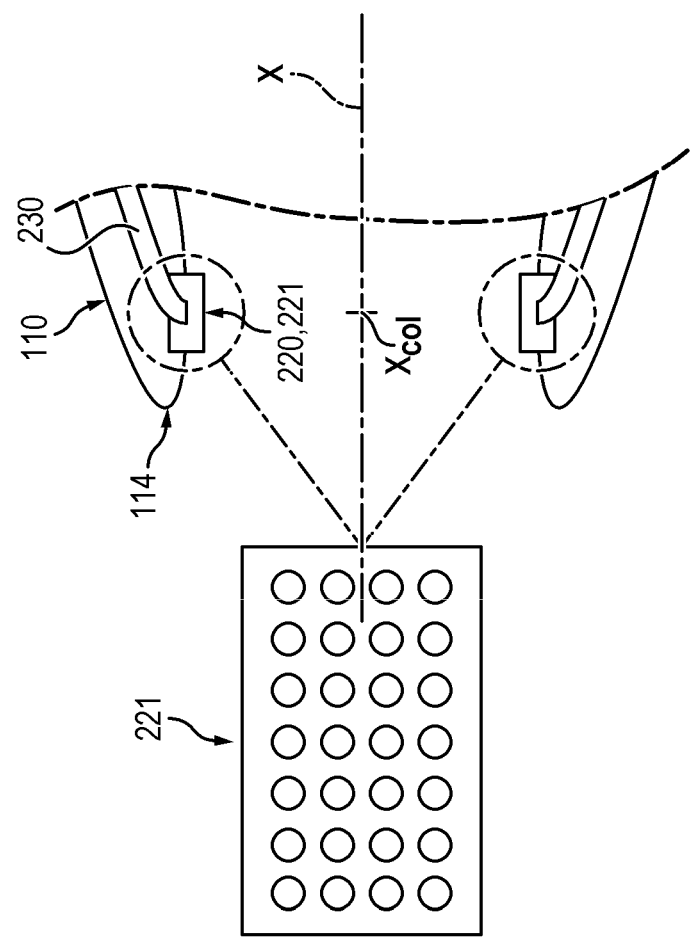

Other characteristics, aims and advantages of the invention will emerge from the following description which is purely illustrative and non-limiting and which must be considered relative to the appended drawings, in which:

FIG. 1 illustrates the general principle of a convergent-divergent nozzle,

FIG. 2 illustrates noise ranges (in decibel) of a turbomachine with and without lobe mixer, FIGS. 3 and 4 illustrate a first embodiment of the invention, in terms of a rear body with a mixer, FIGS. 5 and 6 illustrate another variant of the first embodiment of the invention, for this same scope, FIGS. 7 and 8 illustrate a two-dimensional schematic version and a simplified three-dimensional view of a second embodiment of the invention, in the case of a rear body of turbomachine with mixer, FIG. 9 illustrates a diffuser grille according to the second embodiment.

DETAILED DESCRIPTION

The invention will now be described in relation to FIGS. 3 to 6 and FIGS. 7 to 9.

The rear body of a relevant turbomachine 100 belongs to a dual-flow turbomachine 10, comprising a primary vein Vp and a secondary vein Vs. This is a vein for the volume through which a flow circulates. In the primary vein Vp therefore the primary flow circulates and in the secondary vein Vs therefore the secondary flow circulates.

The turbomachine 10 is arranged about a longitudinal axis X. The abscissa is defined as the position along this longitudinal axis X.

Within the primary vein Vp, the turbomachine 10 comprises classic elements known to the skilled person, such as one or more compression stages, a combustion chamber and finally one or more turbine stages, which cause especially the compressors and also a fan which supplies the secondary vein Vs and provides the main thrust. At the downstream end, the primary vein Vp is defined by a primary nozzle 11 which allows ejection of the primary flow. The primary nozzle 11 can be formed by several separate pieces.

In the same way, within the secondary vein Vs the turbomachine 10 integrates classic elements known to the skilled person. In particular, at the downstream end the secondary vein is defined by a nozzle 110, known as secondary nozzle. In the case of turbomachines LDMF, it extends downstream beyond the primary nozzle 11. Consequently, the secondary nozzle 110 ejects the secondary flow, mixed with the primary flow.

This secondary nozzle 110 is convergent-divergent. As indicated in the introduction, this means that the radius (or the diameter) of the nozzle diminishes then increases again, in the flow direction of the flow. The direct consequence is that the cross-section flow diminishes then increases again.

That part of the nozzle 110, having an abscissa $x_{neck}$ where this cross-section is minimal, is called "neck" 112 of the secondary nozzle.

The convergence-divergence ratio is typically between 100% and 105% (ratio of the cross-section at the trailing edge 114 on the cross-section at the neck 112: $S_f/S_c$).

The nozzle 110 is generally formed by an internal wall 110a and an external hood 110b, which together define a volume 111.

The rear body of turbomachine 100 can also comprise a central body 12 limiting the radial extension of the primary vein inside the nozzle 110. This central body 12 is not dealt with by the invention. It is located on the longitudinal axis X and generally stops after a trailing edge 120 of the nozzle.

The primary nozzle 11 therefore comprises a trailing edge 120, having an abscissa $x_p$ upstream from the abscissa $x_{neck}$. The central body 12, if present, extends longitudinally beyond the trailing edge 120, that is, downstream of the abscissa $x_p$.

This trailing edge 120 can have a circular form, in a cross-section orthogonal to the axis X.

Alternatively, as illustrated in FIGS. 3 to 6 and 8, the primary nozzle 11 can terminate in a lobe mixer 130 the function of which, as indicated in the introduction, is to blend the primary and secondary flows before they are fully ejected from the secondary nozzle 110. In reference to FIG. 3, the lobe mixer 130 is a profiled piece extending inside the secondary nozzle 110, the walls defining inside the primary vein Vp and outside the secondary vein Vs. The mixers can have symmetrical and periodic lobes, or else non-symmetrical and/or non-periodic. The thickness of the trailing edge 120 of the mixer 130 is generally minimal to avoid a cap effect between the two flows. The lobe mixer 130 generally stops at a significant distance from the downstream end of the secondary nozzle 110 to let the flow mixture homogenize. As already stated, the invention applies to the scope of LDMF ("long duct-mixed flow") turbomachines.

As evident in FIGS. 4, 5, 6 and 8, an exemplary embodiment of the mixer 130 is constituted by lobes symmetrical, periodic in azimuth about the longitudinal axis X. In this example, the line of trailing edge 120 has a three-dimensional undulating form in azimuth and regular which passes periodically through a low point 132 of minimum radius and a high point 134 of maximum radius. The form of the mixer is preferably obtained by joining this line of trailing edge 120 by regular smooth surfaces, on one side of the circular cross-section of the external wall of the primary nozzle 11, of the other side of the circular cross-section of the internal wall of secondary vein Vs. Known means let the skilled person produce these smooth surfaces by defining regular laws in variation of radius for joining the inlet cross-sections to the trailing edge 120 of the lobe mixer 130.

In the example presented, the evolutions of the trailing edge 120 of the mixer 130 are periodic. In this way, the average surface between the radially external wall and the radially internal wall of the mixer 130 forms periodic undulations in azimuth about the longitudinal axis X which, on the side of the primary flow under the high points 134 of the trailing edge 120, create divergent lobes (called hot lobes and referenced 134 for simplification), and, on the side of the secondary flow above the low points 132 of the trailing edge 120, create convergent lobes (called cold lobes and referenced 132 for simplification).

In the example presented, the abscissa $x_p$ on the longitudinal axis X which determines the maximal extension of the downstream lobe mixer corresponds to the high points of the hot lobes. An ejection plane passes through the abscissa $x_p$, that is, a plane from which airflow is ejected from the hot lobes. For reasons of simplicity, when positioning considerations are involved, it will be considered that the trailing edge corresponds to the high point of the hot lobes. Therefore, the plane comprising the trailing edge of a primary nozzle without mixer is identical to the ejection plane of the mixer. This exemplary embodiment of mixer comprises eighteen hot lobes symmetrical about the axial plane passing through their centre and distributed periodically.

In another embodiment of the invention, it is possible to define a lobe mixer 130 by modifying its axial extension, the penetration rate of the lobes (determined essentially by the radii of the high 134 and low 132 points of the trailing edge 120), the form of this trailing edge 120, as well as the number of lobes. The lobes can also not have axial planes of symmetry. Similarly, even though the distribution of the lobes is essentially periodic, this periodicity can be locally affected by modifying the form of some lobes, for example for adapting the mixer 130 to a mast gateway.

The lobe mixer 130 favours mixing the primary Vp and secondary Vs flow in the vein inside the secondary nozzle 110, especially by causing shearing and turbulence at the interface between the flow.

Now that the general framework has been described, the means of the invention will be explained.

The secondary nozzle 110 comprises a heating system with a heating element. The heating element is located on at least one portion of the internal circumference of the secondary nozzle, in a longitudinal position in the region of the neck 112, or even upstream from the neck 112 (or both).

This heating system locally heats air and reduces noise. Two particular embodiments, which detail the advantages, will be presented: in the first embodiment, the heating system comprises a heating radiator system (and the heating element is a heating plate) and in the second embodiment, the heating system comprises a hot-air diffusion system (and the heating element is an air diffuser).

First Embodiment (FIGS. 3 to 6)

The secondary nozzle 110 comprises a heating radiator system 140 which serves to reheat the flow passing through the nozzle 110, and more specifically the airflow which passes through the Mach pocket or pockets located in the region of the neck 112, near the internal wall of the nozzle 110. This is therefore an active system.

The heating radiator system 140 comprises one or more heating plates 142 positioned on a portion at least of the internal circumference of the secondary nozzle 110, or over the entire circumference (FIGS. 3 and 4), or partially (FIGS. 5 and 6 for example). The term plate specifies an element which, when placed flat, has a minimal thickness relative to its other main dimensions.

These plates 142 allow optimal integration of the heating radiator system 140 on the internal wall of the secondary nozzle 110 without disrupting the flow of the airflow.

Longitudinally, the heating plate or plates 142 are located in the region of the neck 112, or upstream from the neck 112, that is, between said neck 112 and the trailing edge 120 of the primary nozzle 11.

The aim is that the slipstream penetrating the Mach pocket is reheated so as to limit the acoustic effects. For this reason, since the Mach pocket is downstream of the neck 112, it is not useful for the plates 142 to extend far downstream of the neck 112. A longitudinal downstream extension of the neck length less than $0.2 \times D_{neck}$, where $D_{neck}$ is the diameter of the nozzle 110 at the abscissa $x_{neck}$, is preferable.

As pointed out previously, the heating plate or plates 142 can be positioned upstream from the neck 112. In this configuration, a heating plate or plates 220 not extending longitudinally further upstream than $2 \times D_{neck}$ from the neck 112 is/are emphasized.

Inversely, reheating upstream from the neck 112 heats the flow for the Mach pocket. The heating plate or plates 142 can therefore extend longitudinally, from the neck 112, as far as $2 \times D_{neck}$ upstream.

The heating plates 142 can be made in several ways.

A preferred mode consists of fitting them with electrical resistors which generate heat when an electric current passes through them. The plates can take the form of a grille constituted by heating filaments. The heating plates 142 therefore consist of an electric radiator.

The power supply comes from for example a generator driven by an accessory gearbox ("AGB" for "accessory gearbox") which draws power on a shaft of the turbomachine. Batteries can be provided for supplying the heating plates 142 in the generator is unavailable.

A particular embodiment of the heating radiator system 140 is linked to the presence of the lobe mixer 130.

The lobe mixer 130, which has hot lobes 134 and cold lobes 132, causes different slipstreams which do not follow the same route. In this case, this is above all about the zone between the slipstreams coming from the hot lobes 134 and the secondary nozzle 110 which need to be reheated by the heating radiator system 140.

For this, to save power and optimise placing of the heating radiator system, the latter can comprise a plurality of heating segments 144a, 144b, arranged at a distance from each other over different portions of the circumference of the nozzle 110 (see FIGS. 5 and 6). Each heating segment 144a, 144b is located facing a hot lobe 134. This means that near the longitudinal offset (as shown in FIG. 6, where the heating segments 144a, 144b and the mixer 130 are placed in the same plane), there is a heating segment 144a, 144b located in the radial extension of a hot lobe 134. In other terms, the heating segments 144a, 144b and the hot lobes 134 are at the same azimuths.

The width of the segment 144a, 144b can be equal to radial projection of the lobe on the internal circumference of the secondary nozzle 110 (that is, via orthogonal projection from a point of the longitudinal axis X), or else equal to the width of the lobe or else any dimension of the same order of magnitude (as long as the segments are sufficiently narrow to ensure that they are spaced apart from each other, see FIG. 6).

In any case, the symmetrical assemblies are emphasized, that is, the apex of the hot lobe 134 is radially aligned with the centre of the corresponding heating segment 144a, 144b.

There are preferably as many heating segments 144a, 144b as hot lobes 132.

Each segment can comprise one or more plates 142, as a function of the size of the plates and segments 144a, 144b.

This configuration avoids using power for heating the zone facing the cold lobes whereof the slipstream does not impact the Mach pocket.

In a particular embodiment aiming to preserve the structural integrity of the secondary nozzle 110, the heating plates 142 or the plurality of heating plates 142 can exhibit a temperature gradient to prevent heating of the material on which they are placed. The gradient consists of having a higher temperature at the centre than at the periphery.

A rise in temperature locally of 50° K for example lowers the Mach between 0.90 and 0.95, relative to a Mach of 1 for a temperature of 320° K.

Second Embodiment (FIGS. 7 to 9)

The rear turbomachine body 10 comprises a hot-air diffusion system 200 in the secondary nozzle 110 which serves to reheat the flow passing through the secondary nozzle 110, and more specifically the airflow which passes through the Mach pocket or pockets located in the region of the neck 112, near the wall internal of the nozzle 110.

This system 200 comprises several elements.

An air bleed 210 is provided, in the primary vein Vp, to draw off a fraction of the primary flow. The primary flow is hot.

A diffuser 220 is provided, on at least one portion of an internal circumference of the nozzle 110. Longitudinally, the diffuser is located in the region of the neck 112, or upstream from the neck 112, that is, between said neck 112 and the trailing edge 120 of the primary vein Vp (that is, the ejection plane of the mixer 130 when there is one).

Finally, a pipe 230 fluidically connects the air bleed 210 in the primary vein Vp to the diffuser 220 of the nozzle 110. The pipe 230 passes through the secondary vein Vs.

The function of this diffusion system 220 is to reheat air, and not disrupt flow, such as solutions called "micro-jets" propose (see FR3016411 or FR2975135). This is therefore not an "injection" system which implies that the injected flow will intentionally disrupt flow, "diffusion".

A plurality of air bleed 210 can be provided, distributed over a circumference of the primary vein Vp. This best distributes discharge and diffusion in the diffuser 220. In the same way, a plurality of pipe 230 is provided.

To limit aerodynamic disruption to a maximum, the pipe 230 passes through a structural arm 13. The pipe then extends in the volume 111 between the internal wall 110a and the external hood 110b of the nozzle 110. When a plurality of pipes 130 is provided, these can pass through a plurality of structural shafts 13, either equal or fewer in number, by combining the flows of several air bleeds inside the same pipe 130 if the aim is to provide more air bleeds 210 than there are structural shafts 13.

Still with the same aim of not disrupting the flow of the flow in the nozzle, the diffuser 220 is integrated into the nozzle 110 so that its physical presence does not disrupt the flow of the airflow.

Blocking means are provided for blocking air bleed, such that this is an active system. In fact, it is preferable to be able to deactivate this system during cruising phases. The blocking means are preferably arranged in the region of the air bleed 210 to block the inlet of the conduit 230 so as not to generate gridlock phenomena.

The diffuser can extend over the entire internal circumference of the nozzle, but it can extend only over portions of the internal circumference in specific zones (see infra). Longitudinally, it extends over a certain distance.

The aim is that the contact zone between the slipstreams of the hot lobes of the mixer and the Mach pockets is reheated so as to limit acoustic effects. For this reason, since the Mach pocket is located in the region of the neck 112, it is no longer useful that the diffusers 220 extend far downstream of the neck 112. A longitudinal extension downstream of the neck length less than $0.2 \times D_{neck}$, where $D_{neck}$ is the diameter of the nozzle 110 at the abscissa $x_{neck}$, is preferable.

Inversely, reheating upstream from the neck 112 heats the flow for the Mach pocket. The diffusers 220 can now extend longitudinally, from the neck 112, as far as $1 \times D_{neck}$ upstream or less.

As indicated previously, the diffuser 220 can be positioned upstream from the neck 112. In this configuration, the emphasis is a diffuser 220 which does not extend longitudinally further upstream than $1 \times D_{neck}$ from the neck 112. Preferably, a diffuser is implemented which diffuses on the neck and upstream from the neck, as far as $1 \times D_{neck}$ upstream from the neck 112.

The function of the diffuser 220 is to reheat air by injecting hotter air without disrupting flow. In fact, the diffuser 220 does not function as a nozzle. In a practical embodiment, the diffuser 220 comprises a grille 221, constituted by a plurality of orifices (see FIG. 9). This plurality of orifices distributes air diffusion and diffuses it in the vein of the nozzle 110.

The dimensioning of the air bleed 210 and the diffuser 220, whereof the effective cross-section is mostly greater than that of the air bleed 210 ensures a considerable drop in speed of airflow.

If this is insufficient, to prevent any effect of forced injection, the diffusion system 200 can comprise means for slowing airflow, such as internal grilles, chicanes or the like, for example arranged inside the pipe 230.

The air bleed 210 within the primary flow Vp must be the weakest possible. It is determined as a function of its longitudinal position, the surface of the diffuser 220 and the preferred rise in temperature in the region of the Mach pocket (at a fixed external temperature).

The air bleed 210 can be carried out at various longitudinal placements of the turbomachine.

Air bleed 210 takes place upstream from the trailing edge of the primary vein Vp. When a mixer 130 is provided, air bleed 210 takes place upstream from the mixer, i.e. upstream from the start of the hot and cold lobes.

Preferably, the longitudinal distance between the trailing edge of the primary vein Vp (that is, the ejection plane when there is a mixer 130) and the air bleed is greater than the longitudinal distance between the trailing edge of the primary vein Vp (or the ejection plane) and the neck 112.

In an embodiment, air bleed takes place downstream of a turbine stage. For this, it can be downstream of the low-pressure turbine or between the low-pressure turbine and the high-pressure turbine. Here, the air exits from the combustion chamber: it is therefore hot.

In another embodiment, air bleed can take place in compression stages, where air is heated due to compression.

Alternatively, air can be drawn off in colder zones. There is an exchanger for reheating them (oil or electric).

In an embodiment, the air bleed 210 takes place simply via an opening in an element forming the primary vein Vp, with preferably a grille. Since the pressure is greater in the primary flow than the pressure in the region of the diffuser 220, air will circulate naturally.

In another embodiment, the air bleed 210 se fait with a bailer located in an element forming the primary vein Vp, that is, a piece extending inside the primary vein Vp, in the primary flow, and brings with it a fraction of the flow to the pipe 230.

To make the system active, that is, especially deactivatable, deactivation means of the air bleed can be provided either in the form of a stopper of the opening or in the form of a retractable bailer, for integrating into the element forming the primary vein Vp. The deactivation means can therefore act as the above blocking means.

A particular embodiment of the diffusion system, and more particularly of the diffusers 220, is linked to the presence of the lobe mixer 130.

The lobe mixer 130, which has hot lobes 134 and cold lobes 132, causes slipstreams which do not follow the same route. In this case, this above all concerns slipstreams coming from the hot lobes 134 which need to be reheated by the heating system.

For this, to economise on power and optimise placing of the hot-air diffusion system the latter can comprise a plurality of diffuser segments 224, 226, arranged apart from each other on the circumference of the nozzle 110 (see FIG. 8).

Each segment diffuser 224, 226 is located facing a hot lobe 134. This means that near the longitudinal offset there is a segment diffuser 224 located in the radial extension of a hot lobe 134. In other terms, the diffuser segments 224 and the hot lobes 134 are at the same azimuths.

The width of the segment diffuser 224, 226 can be equal to radial projection of the lobe on the internal circumference of the nozzle (that is, by orthogonal projection from a point of the longitudinal axis X), or roughly equal to half of this radial projection, or else more equal to the width of the lobe or else any dimension of the same order of magnitude (as long as the segments are sufficiently narrow to ensure that they are spaced apart from each other, see FIG. 8).

In any case, symmetrical assemblies are emphasized, that is, the apex of the hot lobe 134 is radially aligned with the centre of the diffuser 224.

There are preferably as many diffuser segments 224, 226 as hot lobes 134.

This configuration avoids using power for heating the slipstream coming from the cold lobes which generate fewer noises in the Mach pockets.

Additions

A rise in temperature locally of 50° K for example aids in lowering the Mach between 0.90 and 0.95, relative to a Mach of 1 for a temperature of 320° K.

The heating system (heating radiator 140 or diffusion system 200) presented gains up to 1 EPNdB cumulatively.

The heating system (heating radiator 140 or diffusion system 200) can be activated on the points of acoustic certification and deactivated during cruising phases so as not to impact performance of the engine, especially in cruising phase. Reheating at the neck and generally upstream from the neck produces an effective progressive effect and the risk of parasite noise is diminished.

Finally, the heating system (heating radiator 140 or diffusion system 200) can be used with any type of trailing edge of secondary nozzle. In fact, since the latter is not arranged downstream of the neck (or in a limited way), the different technologies of trailing nozzle edge, such as the chevrons described in document WO2015/036684, can be implemented without difficulty to further improve acoustic performance of the turbomachine.

The invention claimed is:

1. An assembly for a rear of a dual-flow turbomachine having a longitudinal axis, the assembly comprising:
a secondary nozzle defined about the longitudinal axis and configured to eject a mixture of flows coming from a secondary vein and a primary vein of the turbomachine, the secondary nozzle being of a convergent-divergent form with a neck corresponding to a minimal cross cross-section of the secondary nozzle; and
wherein the assembly comprises a heating radiator system that comprises at least one heating plate and wherein the at least one heating plate extends longitudinally on a portion of an internal circumference of the secondary nozzle from a location downstream of the neck by a distance less than or equal to 20% of a diameter of the secondary nozzle at the neck, over the neck, to a location upstream of the neck by a distance less than or equal to twice the diameter of the secondary nozzle at the neck.

2. The assembly according to claim 1, wherein the at least one heating plate is an electric radiator.

3. The assembly according to claim 1, further comprising:
a primary nozzle defining a portion of the primary vein, wherein the secondary nozzle defines a portion of the secondary vein; and a lobe mixer located at a downstream end of the primary nozzle and having alternating hot lobes extending inside the secondary vein and cold lobes extending inside the primary vein.

4. The assembly according to claim 1, wherein a surface of the heating radiator system has a heating gradient.

5. The assembly according to claim 1, wherein the heating of the radiator system is integrated into the secondary nozzle such that an internal flow surface of the secondary nozzle is continuous so as not to disrupt the mixture of flows.

6. A dual-flow turbomachine comprising the assembly according to claim 1.

7. A dual-flow turbomachine comprising:
the assembly according to claim 1; and
an electric generator.

8. A dual-flow turbomachine comprising:
the assembly according to claim 1; and
a battery that supplies the heating radiator system.

\* \* \* \* \*